(No Model.)
G. E. SPARE.
CONVERTIBLE CARRIAGE.
No. 447,547. Patented Mar. 3, 1891.
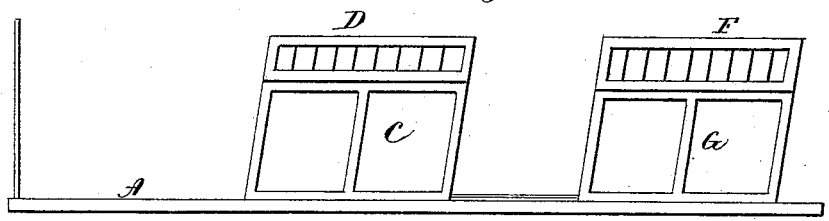
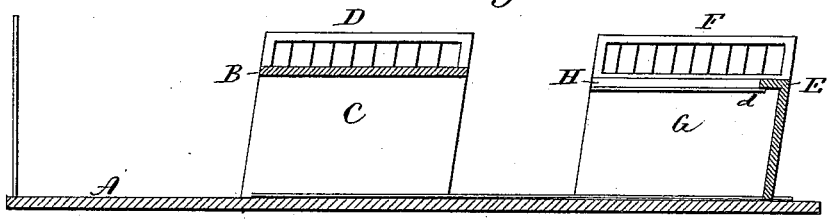
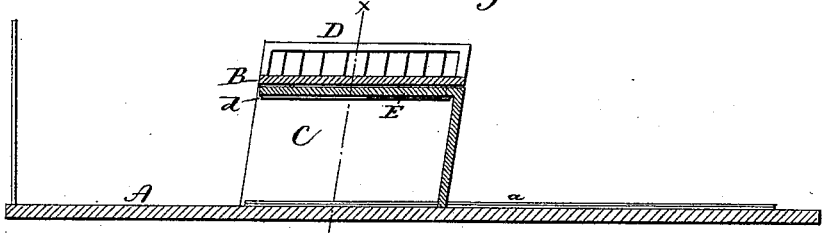
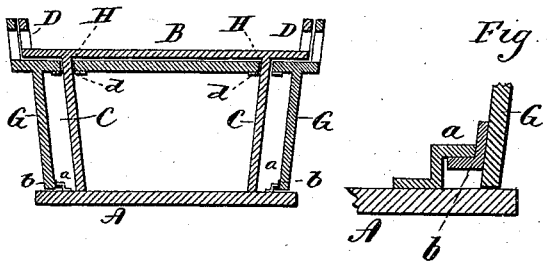
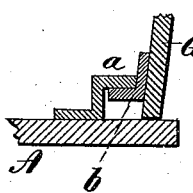
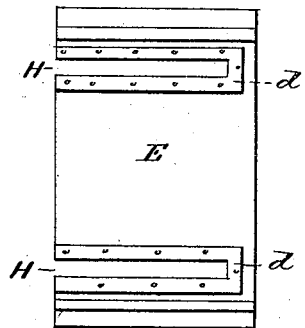
Witnesses
J. N. Shumway
Lillian D. Kelsey
George E. Spare
Inventor
By Atty

UNITED STATES PATENT OFFICE.

GEORGE E. SPARE, OF NEW HAVEN, CONNECTICUT.

CONVERTIBLE CARRIAGE.

SPECIFICATION forming part of Letters Patent No. 447,547, dated March 3, 1891.

Application filed October 25, 1890. Serial No. 369,367. (No model.)

*To all whom it may concern:*

Be it known that I, GEORGE E. SPARE, of New Haven, in the county of New Haven and State of Connecticut, have invented a new Improvement in Convertible Carriages; and I do hereby declare the following, when taken in connection with accompanying drawings and the letters of reference marked thereon, to be a full, clear, and exact description of the same, and which said drawings constitute part of this specification, and represent, in—

Figure 1, a side view of a carriage-body with the seats adjusted as a two-seat carriage; Fig. 2, a longitudinal section of the same, cutting through one of the slots in the rear seat; Fig. 3, the same section as Fig. 2, showing the rear seat as moved to the forward position as a single-seat carriage; Fig. 4, a transverse section on line $x\,x$ of Fig. 3; Fig. 5, an under side view of the rear seat; Fig. 6, a detached enlarged view illustrating the guides in the rear seat.

This invention relates to an improvement in that class of carriages in which two seats are arranged, the forward seat stationary and the rear seat adapted to slide forward and so combine with the forward seat as to present the appearance of a single seat, or when drawn rearward to serve as a second seat in rear of the forward seat, and particularly to that class in which the sliding seat moves upon guides, the object of the invention being a construction in which the adjustable seat may be moved forward or backward without disturbing the forward seat; and the invention consists in the construction as hereinafter described, and particularly recited in the claim.

In the illustrations I represent the body A as of a buckboard-wagon; but this is not material to the invention.

B represents the forward seat, which is supported from the body A upon uprights C C, these uprights being preferably closed, so as to form panel-like ends, as seen in Fig. 1. These uprights are arranged inside the outer end of the seat, and the outer ends of the seat, as well as the back, are provided with a railing D, which forms the back and arms. The space beneath the seat and between the uprights C is left open.

E represents the rear seat, which is provided with a rail F, similar to the rail D around the ends and back, but the length of the seat between the arms or end rails is so much greater than that of the forward seat that the forward seat may stand within the back and ends of the rear seat, and the plane of the rear seat is so much below the plane of the forward seat that the rear seat may slide beneath the forward seat, as seen in Figs. 3 and 4. The rear seat is supported on uprights G G, one at each side, distant from each other greater than the uprights C C, and as seen in Fig. 4. These uprights extend down to the body and are there arranged upon suitable guides. These guides preferably form overhanging flanges $a$, arranged longitudinally on the body, as seen in Fig. 6, and the uprights provided with corresponding hook-shaped flanges $b$ to interlock with the flanges $a$, so as to not only serve as guides for the movement of the seat, but also to prevent the seat from rising. These guides extend from the rear forward.

The seat E is constructed with longitudinal slots H H, open up and down through the seat, as seen in Fig. 5, and corresponding to the uprights C C, the said slots also being open at their forward end, and so that when the seat is moved forward the slots H will pass onto the uprights C until the rear seat is substantially beneath the forward seat, as seen in Fig. 3, the rail of the rear seat then surrounding or standing outside the rail of the forward seat as seen in Figs. 3 and 4. To strengthen the seat, a U-shaped strap of metal $d$ is arranged upon the seat around each side of the slot, as seen in Fig. 5. By this construction the rear seat is of somewhat greater capacity than that of the forward seat, yet when the carriage is converted into a single seat the forward seat still retains its usual capacity, and the carriage has the appearance of a single seat only. The arrangement permits the rear seat to be readily withdrawn from its forward position into the position seen in Figs. 1 and 2, so as to serve as a two-seat carriage.

Instead of the flanged guides for the seat, which I have described, any of the usual guides or devices for supporting the movable seat may be employed.

I claim—

In a carriage convertible from one to two seat, the forward seats suppoted upon uprights in a stationary position, the rear seat arranged in a plane below the plane of the forward seat and supported upon uprights and adapted to slide on the body, the said rear seat constructed with longitudinal slots corresponding to the uprights which support the forward seat, the said slots open at the forward edge of the rear seat, substantially as described, and whereby as the rear seat is moved forward the said slots permit it to pass beneath the forward seat.

In testimony whereof I have signed this specification in the presence of two subscribing witnesses.

GEO. E. SPARE.

Witnesses:
　JOHN E. EARLE,
　GEO. D. SEYMOUR.